(12) United States Patent
Taglialatela Scafati et al.

(10) Patent No.: US 8,429,955 B2
(45) Date of Patent: Apr. 30, 2013

(54) METHOD AND DEVICE FOR DETECTING PEAK VALUES OF PRESSURE IN A CYLINDER OF AN INTERNAL COMBUSTION ENGINE

(75) Inventors: Ferdinando Taglialatela Scafati, Giugliano in Campania (IT); Nicola Cesario, Casalnuovo di Napoli (IT); Domenico Porto, Pedara (IT); Bianca Maria Vaglieco, Naples (IT); Simona Silvia Merola, Naples (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 417 days.

(21) Appl. No.: 12/648,120

(22) Filed: Dec. 28, 2009

(65) Prior Publication Data
US 2010/0162803 A1 Jul. 1, 2010

(30) Foreign Application Priority Data

Dec. 29, 2008 (IT) .............................. VA2008A0069

(51) Int. Cl.
*G01M 15/08* (2006.01)
(52) U.S. Cl.
USPC ...................................... 73/114.16; 73/35.12
(58) Field of Classification Search .................. 73/35.01, 73/35.06, 35.07, 35.12, 114.07, 114.16, 114.17, 73/114.18, 114.22
See application file for complete search history.

(56) References Cited

U.S. PATENT DOCUMENTS

| | | | | | |
|---|---|---|---|---|---|
| 4,584,869 | A | * | 4/1986 | Frodsham | 123/406.38 |
| 4,672,843 | A | * | 6/1987 | Pozniak | 73/114.18 |
| 4,761,993 | A | * | 8/1988 | Klepacki | 73/114.16 |
| 5,119,783 | A | | 6/1992 | Komurasaki | 123/425 |
| 5,535,722 | A | | 7/1996 | Graessley et al. | 123/425 |
| 6,012,425 | A | | 1/2000 | Unland et al. | 123/406.38 |
| 6,273,064 | B1 | | 8/2001 | Scholl et al. | 123/406.24 |
| 6,388,444 | B1 | | 5/2002 | Hahn et al. | 324/378 |
| 6,397,669 | B1 | * | 6/2002 | Raichle et al. | 73/114.06 |
| 6,460,408 | B1 | * | 10/2002 | Gimmler et al. | 73/114.16 |
| 6,598,468 | B2 | * | 7/2003 | Zur Loye et al. | 73/114.06 |
| 6,923,046 | B2 | * | 8/2005 | von Glowczewski et al. | 73/114.16 |
| 7,467,040 | B2 | * | 12/2008 | Ker et al. | 701/102 |
| 7,747,380 | B2 | * | 6/2010 | Chauvin et al. | 701/111 |
| 8,191,532 | B2 | * | 6/2012 | Folkerts et al. | 123/406.11 |
| 8,342,011 | B2 | * | 1/2013 | Galtier et al. | 73/114.16 |
| 2003/0010101 | A1 | * | 1/2003 | Zur Loye et al. | 73/116 |
| 2004/0050363 | A1 | * | 3/2004 | Yamaoka et al. | 123/435 |
| 2004/0118182 | A1 | * | 6/2004 | Glowczewski et al. | 73/35.09 |
| 2010/0106393 | A1 | * | 4/2010 | Sgatti et al. | 701/111 |
| 2010/0313640 | A1 | * | 12/2010 | Galtier et al. | 73/114.17 |

FOREIGN PATENT DOCUMENTS

EP 1 116 945 A2 7/2001

* cited by examiner

*Primary Examiner* — Eric S McCall
(74) *Attorney, Agent, or Firm* — Allen, Dyer, Doppelt, Milbrath & Gilchrist, P.A.

(57) ABSTRACT

A method of detecting during a combustion cycle a peak value of pressure in a cylinder of an internal combustion engine includes providing and installing on the engine body an accelerometer that generates an acceleration signal representing vibrations of the engine body. The acceleration signal is filtered by comparing the band-pass filtered replica of the acceleration signal to a threshold. When the threshold is surpassed, a pressure peak is detected and flagged.

22 Claims, 5 Drawing Sheets

METHOD AND DEVICE FOR DETECTING PEAK VALUES OF PRESSURE IN A CYLINDER OF AN INTERNAL COMBUSTION ENGINE

FIELD OF THE INVENTION

This invention relates in general to control of internal combustion engines and more particularly to a method and hardware system for detecting peak values of pressure in a cylinder of an internal combustion engine during combustion cycles, and a method and device for diagnosing misfire or partial combustion conditions in an internal combustion engine.

BACKGROUND OF THE INVENTION

In order to comply with ever restrictive emission regulations for limiting pollutants, real-time diagnostic techniques for combustion process monitoring in internal combustion (IC) engines are widely used. Information about the quality of combustion may provide important data for diagnosing the working of the engine and may be profitably used for advanced electronic engine controls. These controls are aimed to ensure a good combustion quality in any condition of engine operating by means of real time removal of combustion anomalies, thus improving performances and reducing toxic exhaust gas emissions. Two important combustion anomalies in IC engines are misfire and partial burning. Misfire and partial burning are terms used to indicate an absent and a weak combustion in a combustion cycle. In IC engines these phenomena generally occur when the incoming air/fuel mixture is excessively diluted (with air or with exhaust gas recycled) or when faults occur in the ignition system.

When, in a cylinder of an IC engine, combustion does not occur or occurs only incompletely, unburned fuel enters the exhaust system and eventually burns in the hot catalytic converter.

The released heat may damage or destroy the catalytic converter by thermal overloading. Moreover, misfire and partial burning events lead to instability of the engine and to a rapid increase of hydrocarbon emissions. Current emission regulations force engine manufacturers to equip cars with systems able to detect engine misfires and to alert the driver whenever the misfire rate has the potential to affect the engine after-treatment system. For all these reasons, detection of misfire is a critical issue for electronic engine control systems and several methods have been proposed and used to this aim.

A method largely used to evaluate misfires for on-board diagnosis purposes is based on the analysis of the rotational velocity of the engine by means of signal coming from a crankshaft inductive speed sensor. A misfire event is correlated to characteristic variations in the crankshaft speed: these speed fluctuations are used as misfire indicators for misfire diagnosis. However, the crankshaft speed fluctuation method has difficulties in detecting misfires in some particular conditions.

For example, rough roads can make the engine velocity profile appear as if misfire events were occurring. Moreover, the rotational speed, measured on the crankshaft, is influenced by combustion in all cylinders, thus performances of these misfire detection methods are relatively poor when the total mass of inertia, engine speed, or the number of cylinders increase, because the relative acceleration difference between normal combustion and misfire becomes almost imperceptible under these circumstances.

All these considerations lead to sophisticated hardware and software for analysis and filtering speed data. Alternative methods based on ionization analysis are considered an efficient approach to misfire detection. Their main advantage is exploitation of a component already present inside the combustion chamber, namely the spark plug, for ion-current sensing.

However, the most sensitive and reliable method for misfire and partial burning detection involves direct pressure measurement inside each cylinder of the engine, because the parameter widely considered as the most important parameter for the evaluation of combustion quality is the pressure in the cylinder.

It has been observed that, in case of misfire events, the in-cylinder pressure cycle presents a typical waveform as depicted in FIG. 1. When a misfire event occurs, the in-cylinder pressure peak is located at 0 crank angles (C.A.), that is at the Top Dead Center position of the piston, for every engine working condition. This means that the location of the pressure peak (LPP) is always equal to 0 C.A.

In case of partial burning, due for example to a highly diluted air-fuel mixture, the duration of the combustion process increases and there is no time to complete the combustion before the exhaust gas valve opens. As a consequence, the combustion pressure cycle has a typical shape as depicted in FIG. 2, wherein the pressure peak is significantly shifted to the right of the top Dead Center position (0 C.A.), much more than in the case of "normal combustion".

The above described characteristics of the in-cylinder pressure cycle, during combustion anomalies, demonstrate that the LPP is an important parameter for real time diagnosing the occurrence of misfires or of partial burning events. In particular:

LPP is equal to a zero crank angle in case of misfire events;
LPP falls in a certain angular range of the crank position in case of normal combustion; and
LPP is greater than a certain angular value in case of partial burning.

A drawback of this technique is that it is difficult and relatively expensive to install pressure sensors in the combustion chamber. Moreover, the pressure sensor installed in the cylinder must be capable of withstanding high temperatures and pressures without being damaged. For all these reasons, diagnostic techniques based on cylinder pressure analysis are currently limited to research applications.

Compared to the use of combustion pressure sensors, non-intrusive diagnostic techniques offer several advantages because the sensors are generally placed out of the combustion chamber and thus no structural modifications of the engine are required. Moreover, these sensors do not need to withstand very high pressures and temperatures, therefore they may be of relatively low cost. Several non-intrusive diagnostic techniques have been proposed to measure the quality of combustion in internal combustion engines. Among these techniques, those based on the analysis of accelerometer data have earned a greater success.

The U.S. Pat. No. 6,388,444 discloses a method for detecting misfires, comprising the steps of measuring engine vibration energy caused by combustion by analyzing accelerometer data, measuring instantaneous crankshaft and camshaft positions for determining in which of the combustion chambers of a multiple cylinder engine combustion is expected to occur, and determining whether or not a normal combustion has occurred using both accelerometer data and crankshaft acceleration data.

Essential features of this prior method are the deployment of an accelerometer for sensing vibrations of the engine, a variable reluctance sensor for sensing acceleration of the crankshaft, and the combined processing of the signals generated by the above devices for detecting misfires.

The U.S. Pat. No. 6,273,064 discloses a method wherein the engine vibration data sensed by an accelerometer is sampled during a defined observation window in the combustion cycle during which combustion occurs. The window is calculated using camshaft and crankshaft position sensor data. The accelerometer data are processed to estimate cylinder combustion energy. This computed value is compared to normal combustion energy values with stable combustion. If the computed value deviates more than a desired amount, spark timing, air/fuel ratio or exhaust gas recirculation are adjusted.

The data processing according to these methods is relatively burdensome and expensive. A need remains for a simple and low-cost technique for sensing a misfire or a partial combustion condition in an engine or, basically, for identifying the angular location of the in-cylinder pressure peak (LPP).

SUMMARY OF THE INVENTION

A simple and effective method and a related device for detecting a pressure peak value during a pressure cycle in a cylinder of an internal combustion engine has been found.

According to a general embodiment of the method, an accelerometer is installed on the engine body for sensing vibrations of the engine during its functioning and a band-pass replica of the output acceleration signal is compared with a threshold. An active logic flag is generated when the threshold is exceeded. Preferably, the acceleration signal or a band-pass filtered replica thereof is left unmasked in a time window that include instants at which the piston in the cylinder attains a top dead center position.

According to a general embodiment, the band-pass filtered replica of the acceleration signal is obtained by filtering out frequency components smaller than about 1 kHz and larger than about 2 kHz. According to a preferred embodiment, the band-pass filtered replica of the acceleration signal is obtained by filtering out frequency components smaller than about 1500 Hz and larger to about 1700 Hz.

According to an embodiment, misfires or partial combustion conditions in an internal combustion engine are diagnosed as a function of the crank displacement with respect to the top dead center position of the piston when the active logic flag is generated.

A fuzzy logic for diagnosing eventual misfire or partial combustion events by implementing the above method is also disclosed.

DESCRIPTION OF THE PREFERRED EMBODIMENTS

The device includes at least an accelerometer, preferably, though not necessarily, a MEMS accelerometer installed on the engine body for sensing vibrations and obtaining real time information about in-cylinder pressure of the engine that is used for diagnosing eventual misfire or partial combustion events. The generated diagnostic information may be used for real time controlling the functioning of the engine by preventing or correcting combustion anomalies (such as misfire, partial burning, etc).

Tests carried out by the applicants showed that, in operating conditions of internal combustion engines, there is a high correlation between the vibrational waveform, generated by an accelerometer mounted on the engine body for sensing vibrations of the engine, and the cylinder internal pressure signal.

Figure 1:
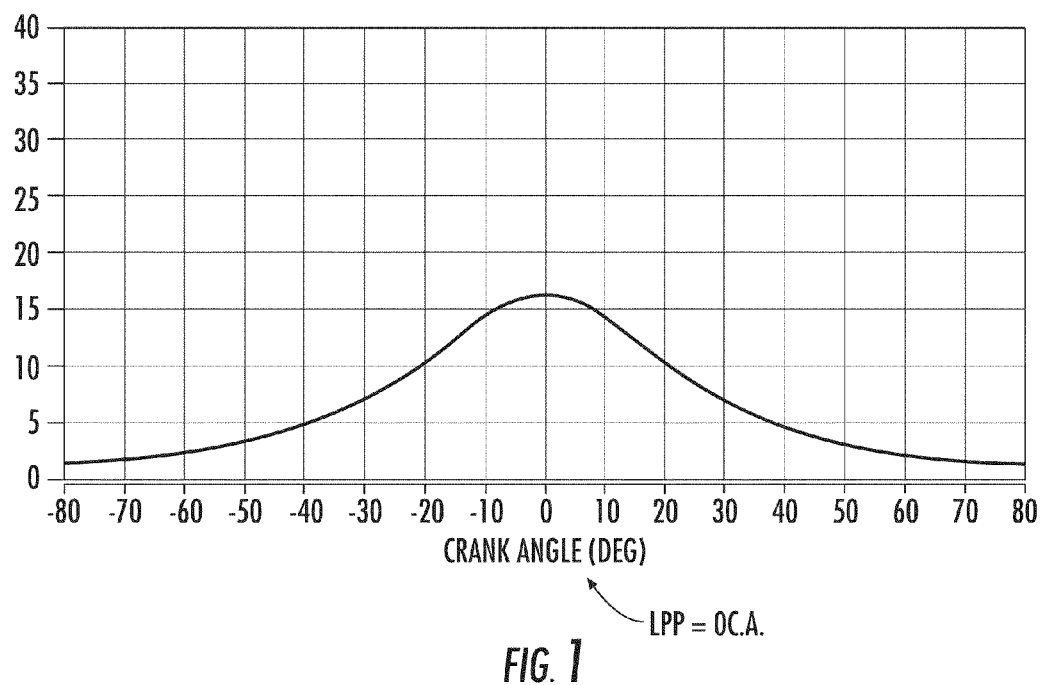
FIG. 1 is an exemplary graph representation of the pressure in a combustion chamber for various crank angles in case of a misfire condition.
Figure 2:
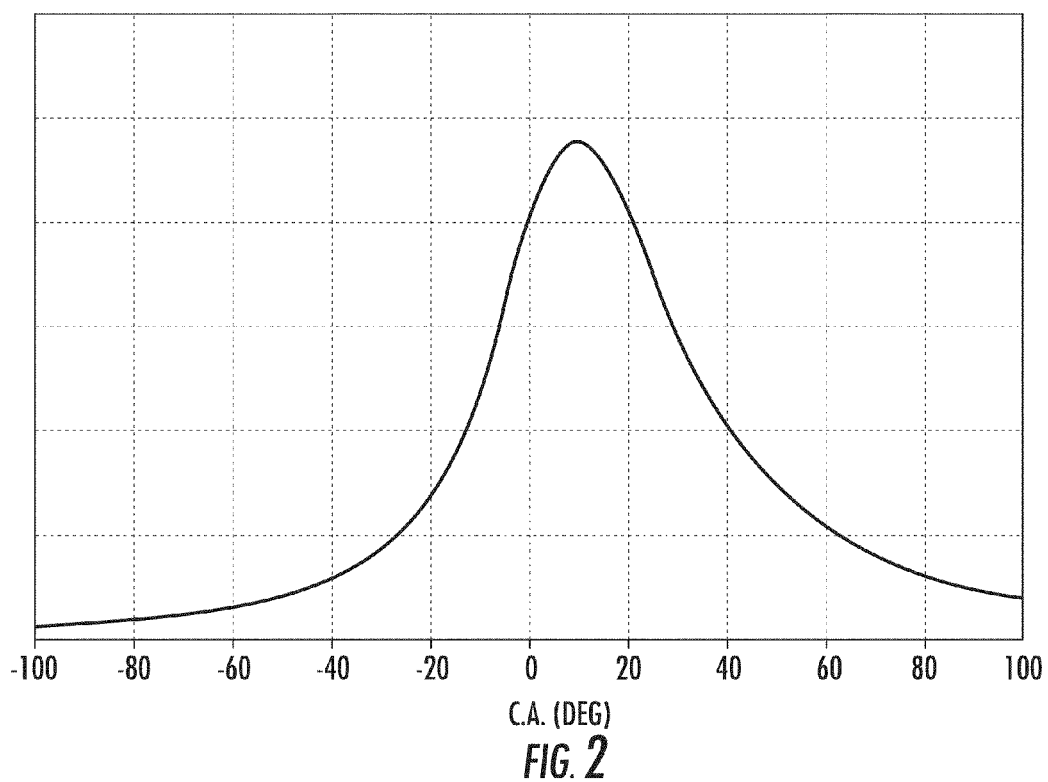
FIG. 2 is an exemplary graph representation of the pressure in a combustion chamber for various crank angles in case of a partial combustion condition.
Figure 3:
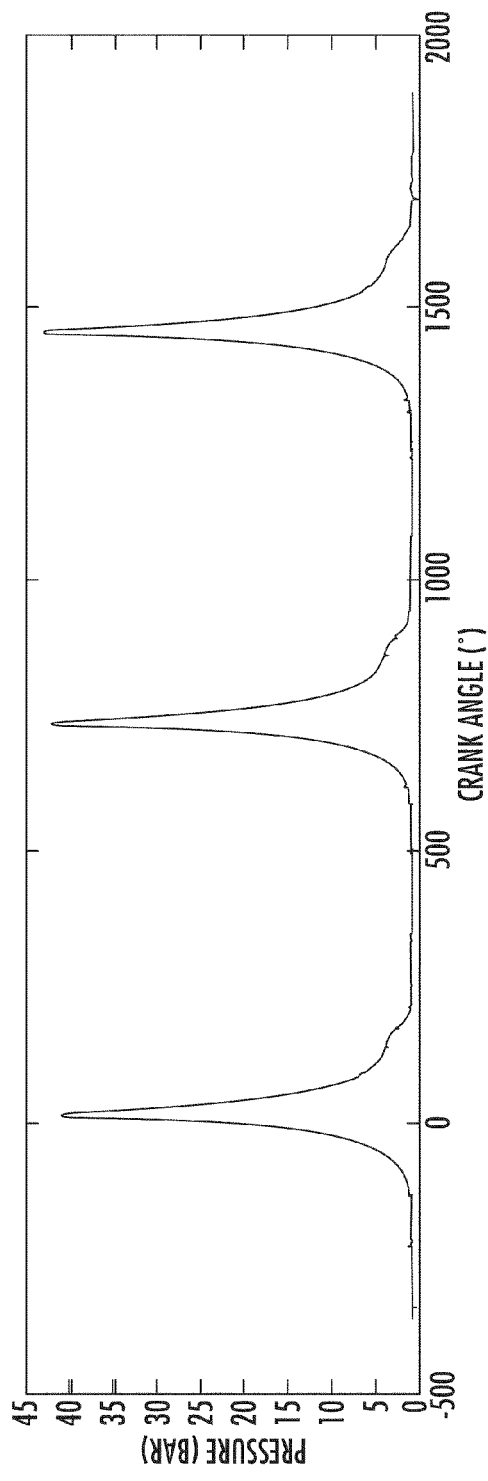
FIG. 3 compares graphical representations of pressure in a combustion chamber and acceleration of engine due to vibration for various crank angles.
Figure 3:
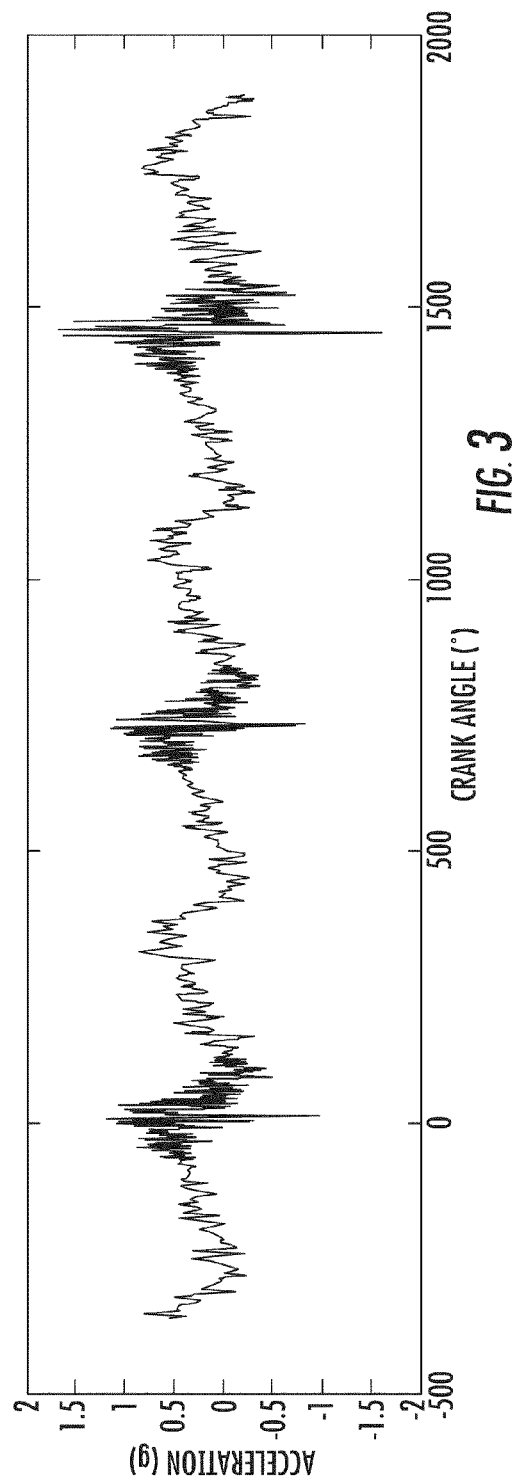

For preliminary test purposes, an accelerometer has been mounted on the body of a single cylinder test engine also having an in-cylinder pressure sensor. The signals generated by the pressure sensor and by the accelerometer were compared for various crank angles as shown in FIG. 3. The graphs clearly confirm the existence of a significant correlation between the two signals. This correlation is even more evident by comparing the frequency spectrum of the acceleration signal of FIG. 4, with that of the pressure signal, shown in FIG. 5.

In particular, when the pressure in the combustion chamber attains a peak value, the acceleration signal has a dominant frequency component. This fact makes possible detection of combustion pressure peaks in a cylinder with a non-intrusive technique by suitably processing accelerometer data. This in turns makes available important information about the combustion quality in spark ignition engines using even a single accelerometer mounted on the engine body.

Figure 4:
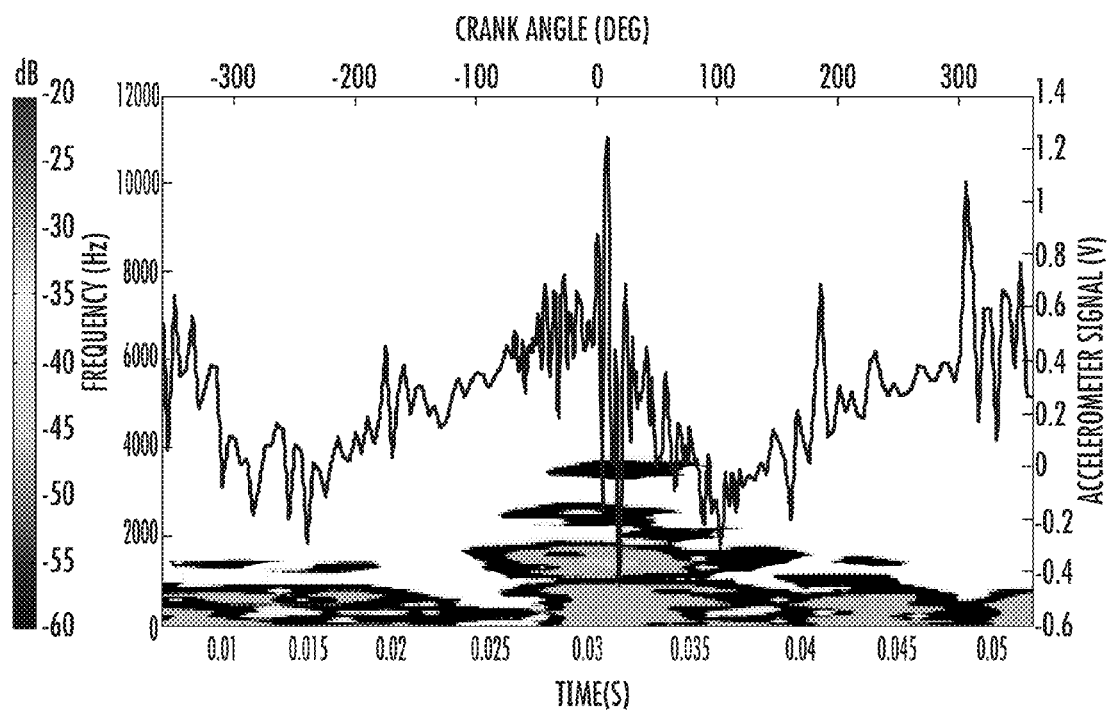
FIG. 4 is a time graph representation of the acceleration signal of FIG. 3 and of its frequency spectrum.
Figure 5:
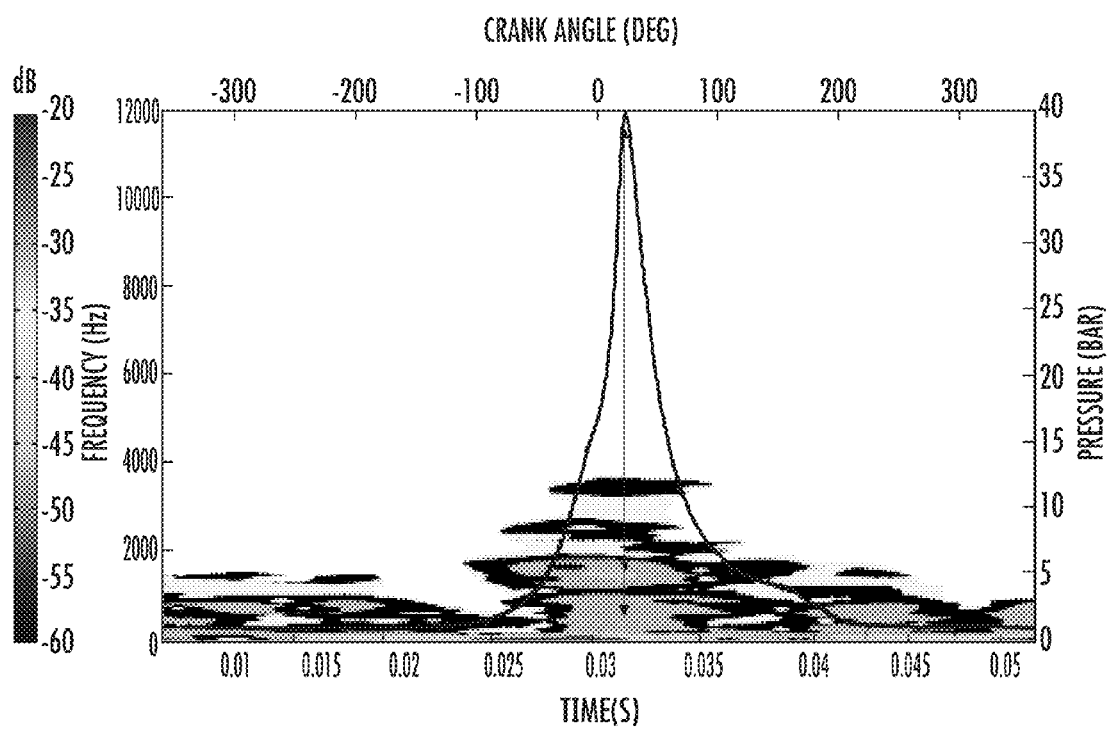
FIG. 5 is a time graph representation of the pressure signal of FIG. 3 and of the frequency spectrum of the acceleration signal.
Figure 6:
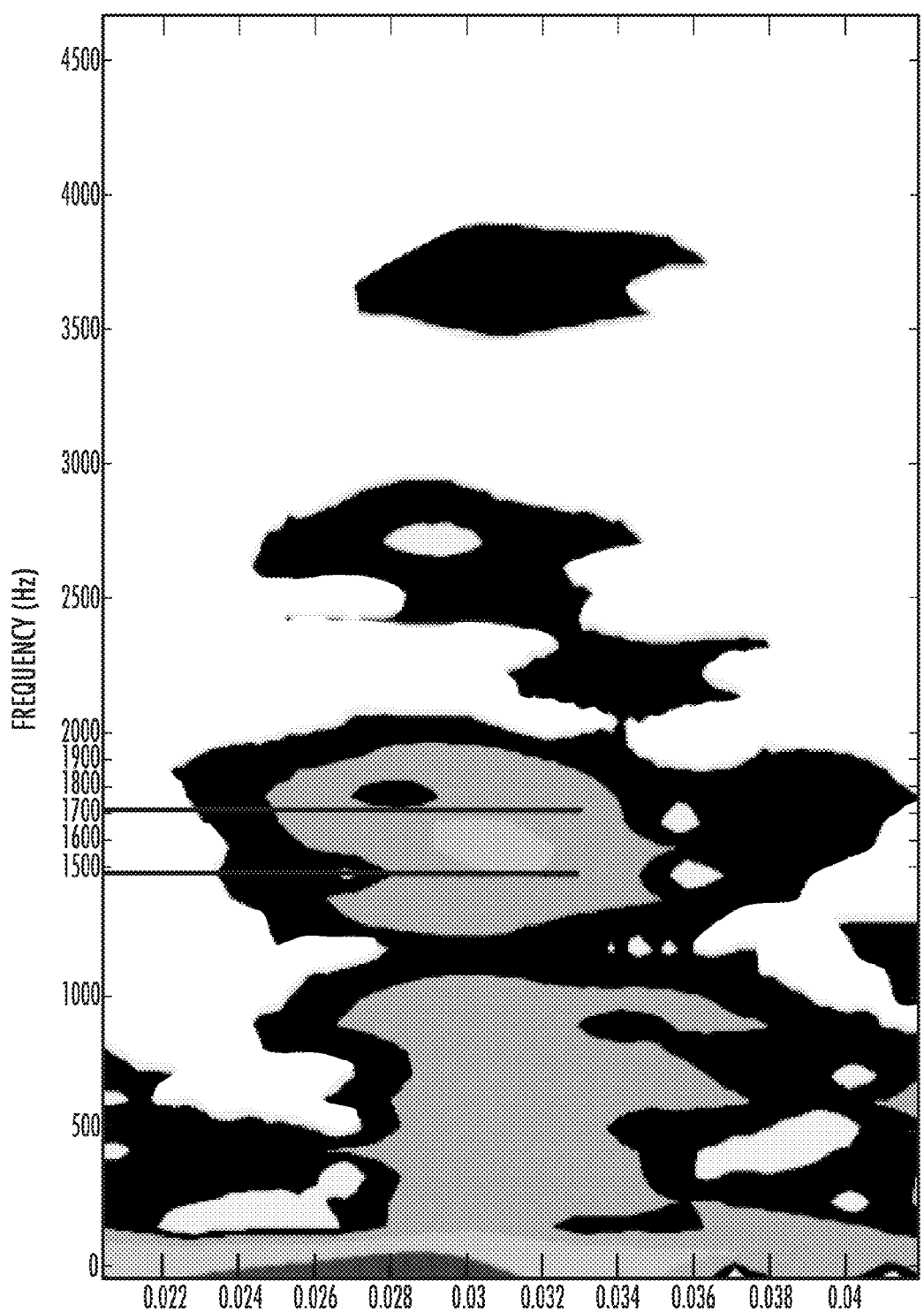
FIG. 6 is a time graph representation of the frequency spectrum of the acceleration signal in a time window that includes the instant at which the crank is in its Top Dead Center position.
Figure 7:
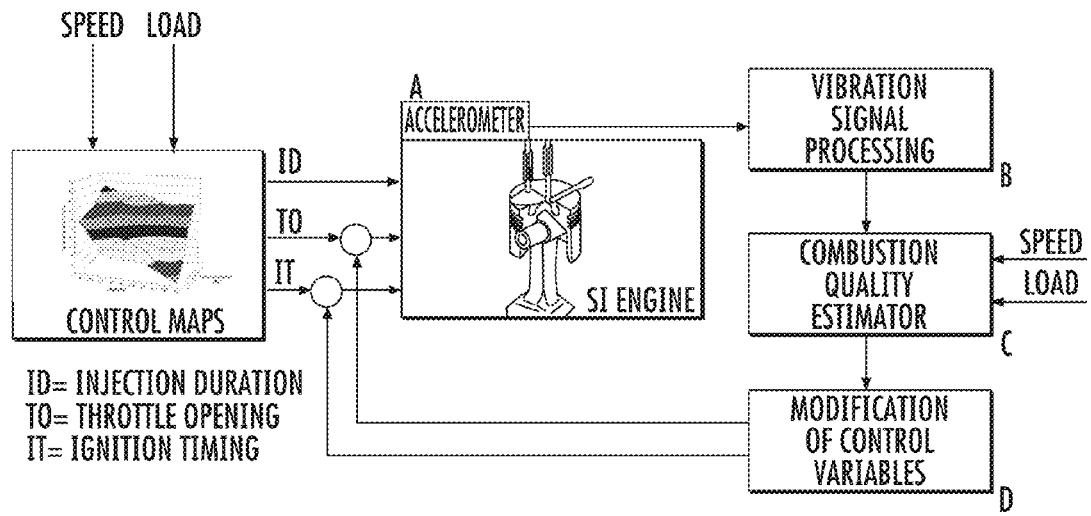
FIG. 7 is a functional block diagram of a system for diagnosing and controlling the functioning of an engine, in accordance with the present invention.

FIG. 6 is a detailed view of the frequency spectrum of the acceleration signal of FIG. 4 in a time window that includes the instant in which the crank attains its Top Dead Center position, at about 0.03 s. From this figure it may be observed that the energy content of the spectrum for frequencies above 1 kHz and below 2 kHz is not negligible in the vicinity of the instant at which the pressure peak occurs. In particular, the frequency components of the acceleration signal in the range from about 1500 Hz to about 1700 Hz shows a relatively large amplitude in correspondence of the in-cylinder pressure peak.

According to the method of this disclosure, a pressure peak in a cylinder is detected by installing an accelerometer on the engine body, band-pass filtering the acceleration signal generated by the accelerometer, comparing the so filtered signal with a threshold, and generating a logically active flag when the threshold is surpassed.

In multi-cylinder engines, a plurality of accelerometers may be installed on the engine body, each accelerometer for a respective cylinder of the engine. The acceleration signal generated by each accelerometer mounted on the engine body is influenced not only by vibrations caused by combustion in the respective cylinder, but also by vibrations due to combustions and motion of pistons into the other cylinders.

In order to accurately detect a pressure peak in a cylinder, a part of the acceleration signal representing the vibration corresponding to the combustion process in the cylinder of interest may be considered. For this reason it is useful to mask the acceleration signal or the band-pass replica thereof in a whole combustion cycle except within time windows that include the instant at which the piston of the cylinder of interest attains its Top Dead Center position, which is assumed to be the reference position (Crank Angle=0°). With this expedient, the portion of the acceleration signal that is more influenced by the combustion in the monitored cylinder is considered.

The system of this disclosure for diagnosing misfire or partial combustion conditions and for controlling an engine substantially may comprise at least an accelerometer (block A) mounted on the body of a spark ignition engine SI ENGINE for sensing vibrations of the engine. A circuit (block B) processes the acceleration signal generated by the accelerometer.

Engine body vibrations are due to several sources such as valve opening and closing, piston slaps, combustion process and additive noise. Transient waveforms generated by these sources overlap each other and the contribution of interest may helpfully be singled out. In order to extract information about the combustion process from the accelerometer signal, the vibration signal is firstly filtered in an Electronic Control Unit (ECU) by means of a pass-band filter. The cut-off frequencies of the band-pass filter depend in general on structural and combustion characteristics of the particular engine being used and thus they may be different for different engines. For this reason, the cut-off frequencies of the band-pass filter should be experimentally determined in a setup phase, after having mounted the accelerometer on the engine body.

It has been found that, for the tested engines, the accelerometer signal contains dominant frequencies in the range from about 1 kHz and about 2 kHz, when combustion peaks occur.

According to an embodiment, the cut-off frequencies of the band-pass filter are about 1500 Hz and about 1700 Hz.

In case of multi-cylinder engines, the vibration signal coming from an accelerometer is influenced not only by vibrations in the cylinder of interest, but also by vibrations coming from piston movement into the other cylinders. In order to enhance reliability in detecting pressure peaks in a certain cylinder, a part of the vibration signal should be processed. For this reason, the vibration signal coming from the band-pass filter is properly windowed and a part of this signal (which occurs in a defined angular window of the crank angle) is considered. Finally, the angular location of maximum amplitude (LMA) of the filtered and windowed accelerometer signal is obtained. The LMA value is output by the Block B and is sent to the Block C.

The circuit Block C diagnoses the occurrence of a misfire or a partial burning condition in function of the estimated LMA value coming from the block B, of the speed of the engine SPEED and of the supplied torque LOAD. Preferably, in order to have a more robust control and avoid engine instabilities, the evaluation of combustion quality and the consequent control action are performed after several consecutive engine cycles (for example every 10 or more cycles).

The Block C may use an analog buffer capable of performing the LMA values acquisition for 10 consecutive engine cycles (or any other set number). Estimation of combustion quality is preferably obtained by means of a fuzzy system which uses the information coming from the analog buffer. The fuzzy system is designed to be a "classifier" of the combustion phenomena. The output of this fuzzy system is a combustion index, that is, an index describing the membership to a class of combustion anomalies (e.g. 0-class for misfire, 1-class for partial burning and so on . . . ).

Finally, depending on the combustion index, a controller (block D) modifies in real time the reference throttle opening time TO and the reference ignition time IT, in order to eliminate eventually diagnosed combustion anomalies.

Figure 8:
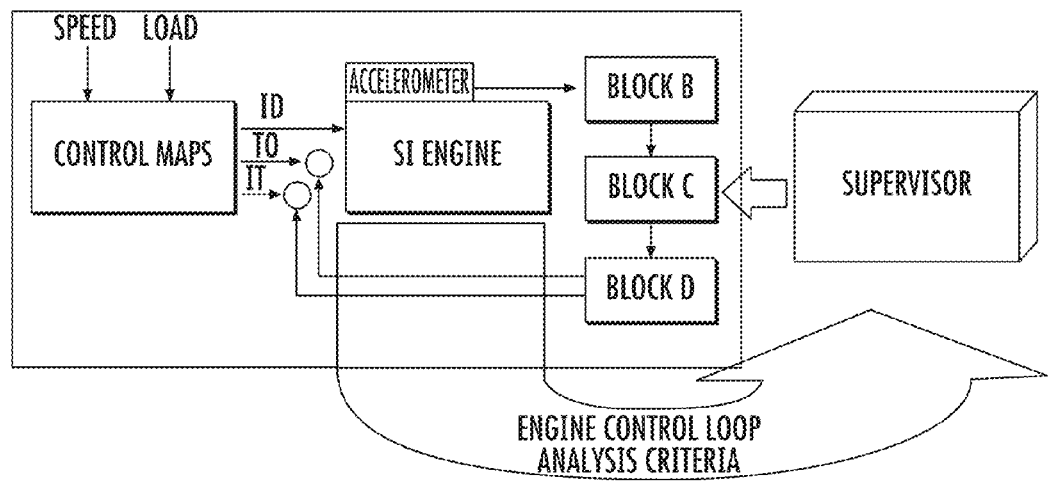
FIG. 8 is a functional block diagram of the system of FIG. 7 provided with a supervising unit SUPERVISOR for training off-line the fuzzy system BLOCK C.

The fuzzy system (i.e. rules, membership function shape, inference model, etc. . . . ) may be preliminarily trained in a supervised mode according to the scheme of FIG. 8, with an optimization algorithm.

The block SUPERVISOR analyzes some data inherent to the engine control loop (e.g. number of partial burning and misfire in the engine speed range, time in which the air/fuel ratio is at its stoichiometric value, etc. . . . ) and, in function of these parameters, modifies the parameters of the fuzzy system (i.e. the block C) in order to obtain the optimal tradeoff between the contrasting objectives of minimization of the time in which the air/fuel ratio differs from the stoichiometric value, and minimization of misfire and partial burning conditions.

That which is claimed is:

1. A method of detecting a peak pressure of a cylinder of an internal combustion engine during a combustion cycle comprising:
   generating, with a microelectromechanical system (MEMS) accelerometer, an acceleration signal representing vibrations of the internal combustion engine;
   filtering the acceleration signal and comparing the filtered acceleration signal to a threshold; and
   determining that the cylinder has reached the peak pressure based upon the filtered acceleration signal exceeding the threshold.

2. The method of claim 1, wherein the acceleration signal is filtered with a band-pass filter.

3. The method of claim 1, further comprising masking at least one of the acceleration signal and the filtered acceleration signal during the combustion cycle when a piston of the cylinder is not at a top dead center position.

4. The method of claim 1, wherein the filtering includes filtering out frequency components smaller than 1 kHz and larger than 2 kHz.

5. The method of claim 1, wherein the filtering includes filtering out frequency components smaller than 1500 Hz and larger than 1700 Hz.

6. The method of claim 1, further comprising:
   determining a crank position, with respect to a top dead center position of the piston, at which the obtainment of the peak pressure of the cylinder is determined; and
   generating a logic signal representing at least one of a misfire condition and a partial combustion condition based upon the crank position.

7. The method of claim 6, wherein the logic signal is generated using a fuzzy algorithm and based upon the crank position, a speed value of the internal combustion engine, and a sensed engine torque value.

8. A method of detecting a peak pressure of a cylinder of an internal combustion engine during a combustion cycle comprising:
   generating, with an accelerometer, an acceleration signal representing vibrations of the internal combustion engine;

filtering, with a band-pass filter, the acceleration signal and comparing the filtered acceleration signal to a threshold;

determining that the cylinder has reached the peak pressure based upon the filtered acceleration signal exceeding the threshold;

determining a crank position, with respect to a top dead center position of the piston, at which the obtainment of the peak pressure of the cylinder is determined; and generating a logic signal representing at least one of a misfire condition and a partial combustion condition using a fuzzy algorithm and based upon the crank position, a speed value of the internal combustion engine, and a sensed engine torque value.

9. The method of claim 8, further comprising masking at least one of the acceleration signal and the filtered acceleration signal during the combustion cycle when a piston of the cylinder is not at a top dead center position.

10. The method of claim 8, wherein the filtering includes filtering out frequency components smaller than 1 kHz and larger than 2 kHz.

11. The method of claim 8, the filtering includes filtering out frequency components smaller than 1500 Hz and larger than 1700 Hz.

12. A system for detecting a peak pressure of a cylinder of an internal combustion engine during a combustion cycle comprising:

a microelectromechanical system (MEMS) accelerometer configured to generate an acceleration signal representing vibrations of the internal combustion engine;

a filter for filtering the acceleration signal and comparing the filtered acceleration signal to a threshold; and circuitry configured for determining that the cylinder has reached the peak pressure of the cylinder based upon the filtered acceleration signal exceeding the threshold.

13. The system of claim 12, wherein the filter comprises a band-pass filter.

14. The system of claim 12, further comprising masking at least one of the acceleration signal and the filtered acceleration signal during the combustion cycle when a piston of the cylinder is not at a top dead center position.

15. The system of claim 12, wherein the filter is for filtering out frequency components smaller than 1 kHz and larger than 2 kHz.

16. The system of claim 12, wherein the filter is for filtering out frequency components smaller than 1500 Hz and larger than 1700 Hz.

17. The system of claim 12, wherein the circuitry is also configured for:

determining a crank position, with respect to a top dead center position of the piston, at which the obtainment of the peak pressure of the cylinder is determined; and generating a logic signal representing at least one of a misfire condition and a partial combustion condition based upon the crank position.

18. The system of claim 17, wherein the circuitry generates the logic signal using a fuzzy algorithm and based upon the crank position, a speed value of the internal combustion engine, and a sensed engine torque value.

19. A system detecting a peak pressure of a cylinder of an internal combustion engine during a combustion cycle comprising:

an accelerometer configured to generate an acceleration signal representing vibrations of the internal combustion engine;

a band-pass filter for filtering the acceleration signal and comparing the filtered acceleration signal to a threshold; and circuitry configured for
determining that the cylinder has reached the peak pressure of the cylinder based upon the filtered acceleration signal exceeding the threshold, determining a crank position, with respect to a top dead center position of the piston, at which the obtainment of the peak pressure of the cylinder is determined, and generating a logic signal representing at least one of a misfire condition and a partial combustion condition using a fuzzy algorithm and based upon the crank position, a speed value of the internal combustion engine, and a sensed engine torque value.

20. The system of claim 19, further comprising masking at least one of the acceleration signal and the filtered acceleration signal during the combustion cycle when a piston of the cylinder is not at a top dead center position.

21. The system of claim 19, wherein the filter is for filtering out frequency components smaller than 1 kHz and larger than 2 kHz.

22. The system of claim 19, wherein the filter is for filtering out frequency components smaller than 1500 Hz and larger than 1700 Hz.

* * * * *